US009096096B2

(12) United States Patent
Chen

(10) Patent No.: US 9,096,096 B2
(45) Date of Patent: Aug. 4, 2015

(54) HUB MODULE

(71) Applicant: Kun Teng Industry Co., Ltd., Taichung (TW)

(72) Inventor: Hubert Chen, Taichung (TW)

(73) Assignee: Kun Teng Industry Co., Ltd., Taichung (TW)

( * ) Notice: Subject to any disclaimer, the term of this patent is extended or adjusted under 35 U.S.C. 154(b) by 0 days.

(21) Appl. No.: 14/162,621

(22) Filed: Jan. 23, 2014

(65) Prior Publication Data

US 2014/0312680 A1   Oct. 23, 2014

(30) Foreign Application Priority Data

Apr. 17, 2013   (TW) .............................. 102206999 U

(51) Int. Cl.
*F16D 23/00* (2006.01)
*B60B 27/04* (2006.01)
*B60B 27/02* (2006.01)

(52) U.S. Cl.
CPC ............... *B60B 27/04* (2013.01); *B60B 27/023* (2013.01); *B60B 2900/116* (2013.01)

(58) Field of Classification Search
CPC  B60B 27/04; B60B 2900/116; B60B 27/023; B60B 27/0015
USPC ...................... 192/64, 45.001, 41 R, 31, 45.1
See application file for complete search history.

(56) References Cited

U.S. PATENT DOCUMENTS

| 3,866,726 | A  | * | 2/1975 | Arenz ........................ 192/217.6 |
| 4,461,375 | A  | * | 7/1984 | Brown ..................... 192/45.018 |
| 5,492,211 | A  | * | 2/1996 | Wu .............................. 192/115 |
| 6,260,681 | B1 | * | 7/2001 | Chen ............................... 192/64 |
| 6,374,975 | B1 | * | 4/2002 | Schlanger ....................... 192/64 |
| 6,557,684 | B1 | * | 5/2003 | Jager et al. ..................... 192/64 |
| 7,191,884 | B2 | * | 3/2007 | Kanehisa et al. ............... 192/64 |
| 7,562,755 | B2 | * | 7/2009 | Spahr .............................. 192/64 |
| 2008/0200290 | A1 | * | 8/2008 | Goring ........................... 474/80 |
| 2008/0200292 | A1 | * | 8/2008 | Goring ......................... 474/116 |
| 2009/0191996 | A1 | * | 7/2009 | D'Aluisio ..................... 474/152 |
| 2011/0175433 | A1 | * | 7/2011 | Chiang ...................... 301/110.5 |
| 2011/0193406 | A1 | * | 8/2011 | Chiang ...................... 301/110.5 |
| 2012/0133199 | A1 | * | 5/2012 | Chiang ...................... 301/110.5 |

* cited by examiner

*Primary Examiner* — David J Hlavka
(74) *Attorney, Agent, or Firm* — Christensen O'Connor Johnson Kindness PLLC

(57) ABSTRACT

A hub module includes an axle member, a hub shell mounted on the axle member, at least two sprocket carriers, and a pair of end caps respectively secured to opposite ends of the axle member. Each of the sprocket carriers includes a carrier body having an outer profile, and a bearing unit mounted in the carrier body. The outer profiles of the carrier bodies of the sprocket carriers are different from each other. The bearing units of the sprocket carriers are the same in total length and inner diameter. Any one of the sprocket carriers is able to be mounted on a carrier-mounting section of the axle member and cooperates with the axle member and the hub shell to serve as a hub assembly.

7 Claims, 4 Drawing Sheets

HUB MODULE

CROSS-REFERENCE TO RELATED APPLICATION

This application claims priority of Taiwanese Application No. 102206999, filed on Apr. 17, 2013.

BACKGROUND OF THE INVENTION

1. Field of the Invention

The invention relates to a hub assembly, more particularly to a hub module including a specific axle member and a plurality of sprocket carriers that have different outer profiles and that can be alternatively mounted on the specific axle member to serve as a hub assembly.

2. Description of the Related Art

A hub assembly of a bicycle is mounted to a rear fork of the bicycle for being mounted with a rear wheel, and includes an axle, a hub shell, a sprocket carrier, a sprocket assembly, a ratchet mechanism, and a pair of end caps. The hub shell is mounted rotatably on the axle for being mounted with the rear wheel. The sprocket carrier is mounted rotatably on the axle. The sprocket assembly is mounted co-rotatably on the sprocket carrier. The ratchet mechanism is provided between the hub shell and the sprocket carrier. The end caps are secured on opposite ends of the axle, respectively.

There are three types of conventional hub assemblies, namely SHIMANO type, CAMPAGNOLO type and SRAM type. The sprocket assembly, the sprocket carrier and the axle of each of these conventional hub assemblies have particular specifications, and the components of these conventional hub assemblies lack universality.

Taiwanese Utility Model Patent No. M399087 discloses another conventional sprocket carrier that is engageable with both of the SHIMANO and CAMPAGNOLO sprocket assemblies. However, this conventional sprocket carrier has an inferior mechanical strength since it has more hollow portions compared with other conventional sprocket carriers, and is not designed to be engageable with the SRAM sprocket assembly.

SUMMARY OF THE INVENTION

Therefore, the object of the present invention is to provide a hub module that can overcome the aforesaid drawbacks associated with the prior arts.

Accordingly, a hub module of the present invention includes an axle member, a hub shell, at least two sprocket carriers, a spacing member and a pair of end caps. The axle member extends along an axis and has two threaded portions at opposite ends thereof that are disposed along the axis, and a central portion that has a hub-mounting section and a carrier-mounting section disposed along the axis. The hub shell includes a shell body that surrounds and that is rotatable about the hub-mounting section of the central portion of the axle member, a driven structure that is provided on the shell body, and a first bearing unit that includes a pair of bearings spaced apart along the axis and journaled between the shell body and the hub-mounting section of the central portion of the axle member. Each of the sprocket carriers includes a tubular carrier body, a driving structure and a second bearing unit. The carrier body of each of the sprocket carriers has an outer profile and an inner through hole. The outer profiles of the carrier bodies of the sprocket carriers are different from each other. The inner through hole extends in an axial direction of the carrier body, and has an installation hole section and a remaining hole section along the axial direction. The installation hole section of each of the sprocket carriers has a length the same as that of the carrier-mounting section of the central portion of the axle member. The driving structure of each of the sprocket carriers is provided on the carrier body. The second bearing unit of each of the sprocket carriers includes inner and outer bearings and a spacing sleeve. The inner and outer bearings of each of the sprocket carriers are respectively disposed at opposite ends of the installation hole section of the inner through hole. The spacing sleeve of each of the sprocket carriers is sandwiched between the inner and outer bearings. Each of the inner bearings, the outer bearings and the spacing sleeves of the sprocket carriers has an inner diameter that is equal to an outer diameter of the carrier-mounting section of the central portion of the axle member. Any one of the sprocket carriers is able to be mounted on the carrier-mounting section of the central portion of the axle member and cooperates with the axle member and the hub shell to serve as a hub assembly. The inner and outer bearings and the spacing sleeve of the mounted one of the sprocket carriers are mounted on the carrier-mounting section of the central portion of the axle member with the inner bearing being proximate to the hub-mounting section of the central portion of the axle member such that the carrier body of the mounted one of the sprocket carriers is rotatable relative to the axle member. The driving structure of the mounted one of the sprocket carriers meshes with the driven structure of the hub shell such that rotation of the carrier body of the mounted one of the sprocket carriers drives rotation of the shell body of the hub shell. The spacing member is mounted on the axle member and is sandwiched between the first bearing unit and the second bearing unit of the mounted one of the sprocket carriers. The end caps are secured respectively on the threaded end portions of the axle member for positioning the hub shell and the mounted one of the sprocket carriers on the axle member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
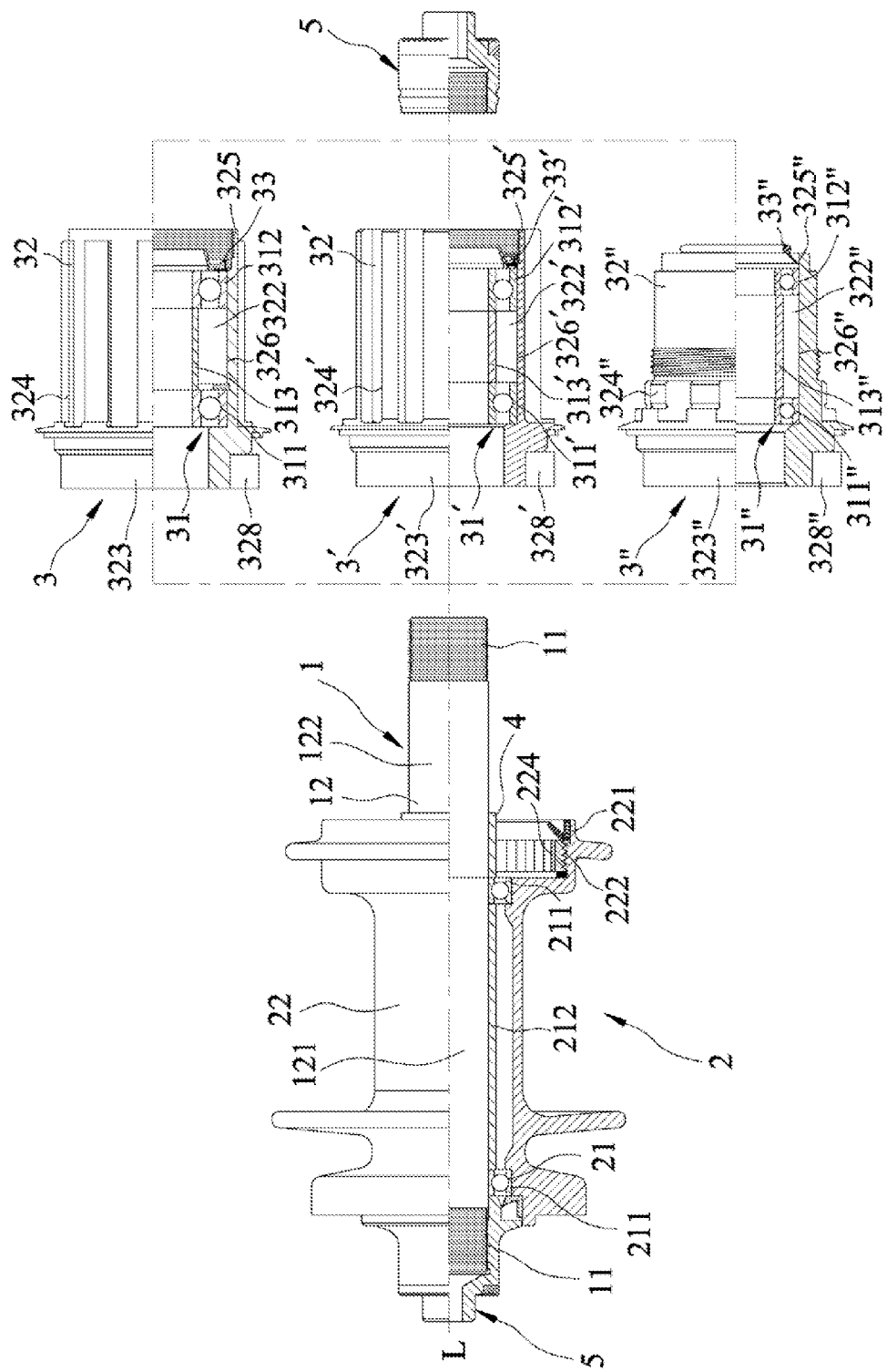
FIG. 1 is a partly exploded and partly sectional view of a preferred embodiment of a hub module according to the invention, illustrating the preferred embodiment including three sprocket carriers.

As shown in FIG. 1, the preferred embodiment of a hub module according to the present invention includes an axle member 1, a hub shell 2, a plurality of sprocket carriers 3, 3', 3'', a spacing member 4 and a pair of end caps 5.

The axle member 1 extends along an axis (L), and has a central portion 12 and two threaded portions 11 at opposite ends thereof that are disposed along the axis (L). Each of the threaded end portions 11 is formed with an external thread. The central portion 12 has a hub-mounting section 121 and a carrier-mounting section 122 that are disposed along the axis (L) between the threaded end portions 11. In this embodiment, an end segment of the carrier-mounting section 122 that is connected to one of the threaded end portions 11 is formed with an external thread that is connected integrally to the external thread of the one of the threaded end portions 11.

The hub shell 2 includes a shell body 22, a driven structure 222 and a first bearing unit 21. The shell body 22 surrounds and is rotatable about the hub-mounting section 121 of the central portion 12 of the axle member 1. The first bearing unit 21 includes a pair of bearings 211 and a spacing sleeve 212. The bearings 211 are spaced apart from each other along the axis (L), and are journaled between the shell body 22 and the hub-mounting section 121 of the central portion 12 of the axle member 1. The spacing sleeve 212 is mounted on the hub-mounting section 121, and is sandwiched between the bearings 211. The shell body 22 has an end surrounding wall portion 221 proximate to the carrier-mounting section 122 of the axle member 1. The driven structure 222 is provided on an inner surrounding surface of the end surrounding wall portion 221 of the shell body 22, and includes a plurality of angularly spaced-apart teeth 224.

Figure 2:
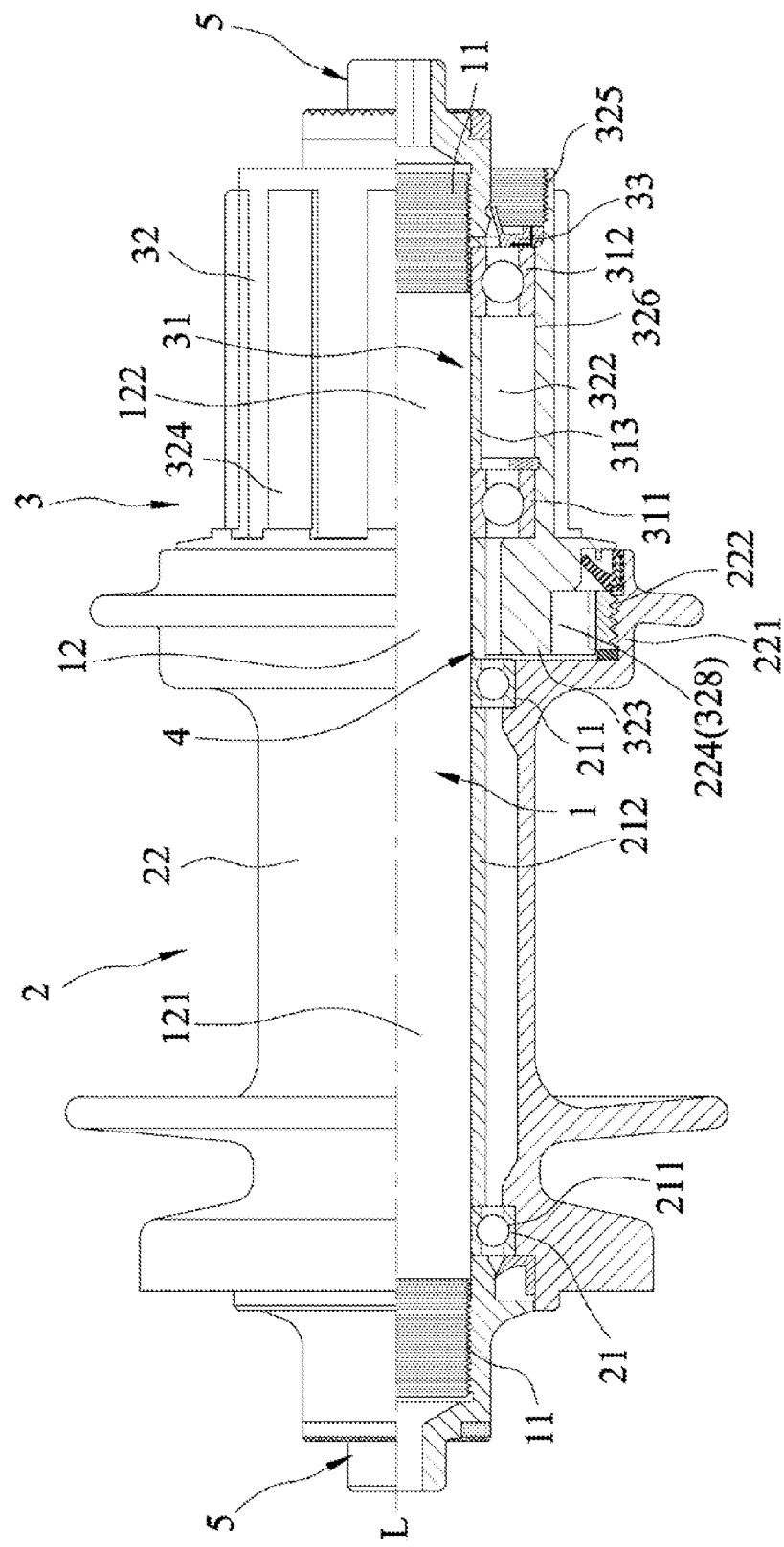
FIG. 2 is an assembled partly sectional view, illustrating one of the sprocket carriers being mounted on an axle member of the preferred embodiment.
Figure 3:
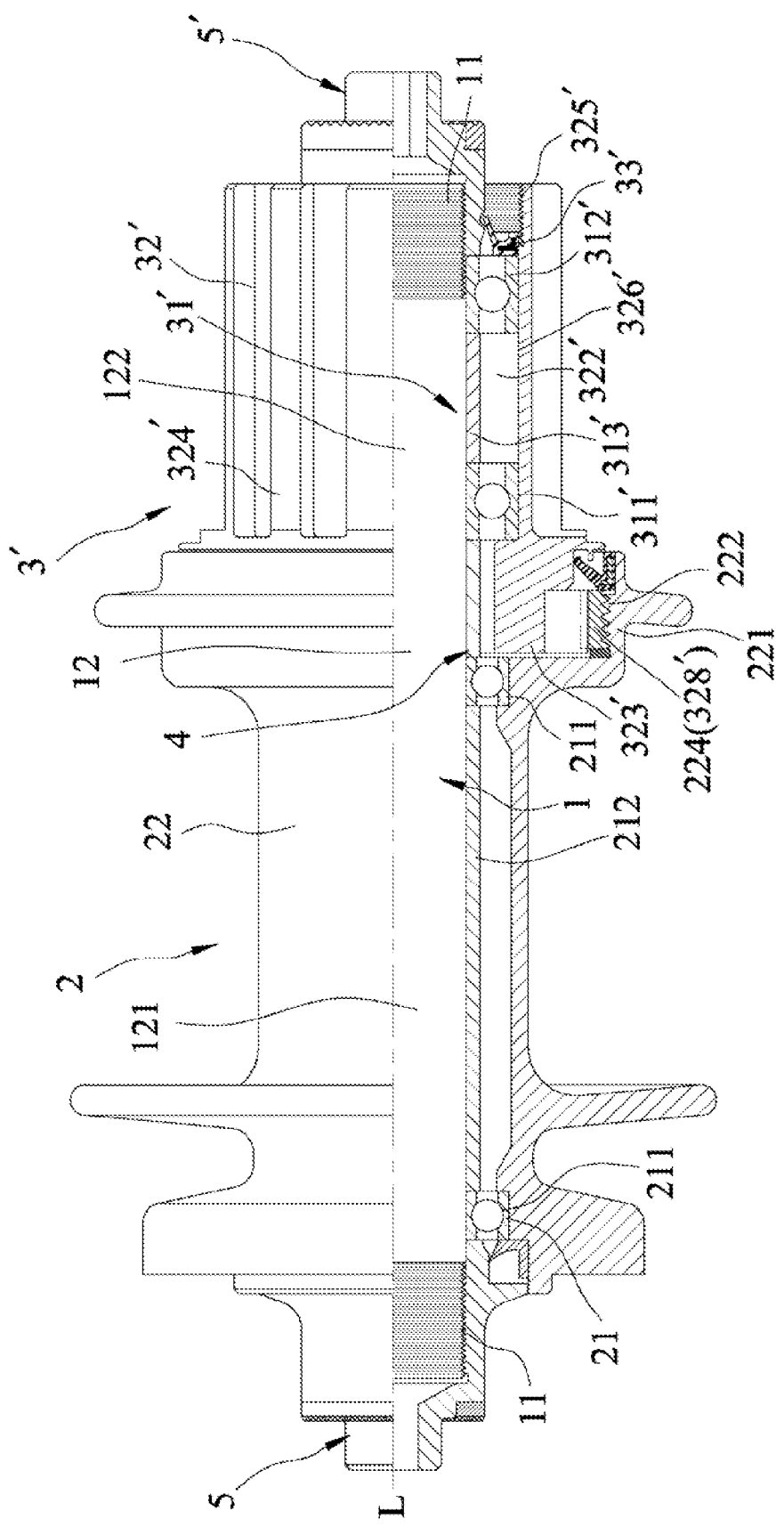
FIG. 3 is an assembled partly sectional view, illustrating another one of the sprocket carriers being mounted on the axle member of the preferred embodiment.
Figure 4:
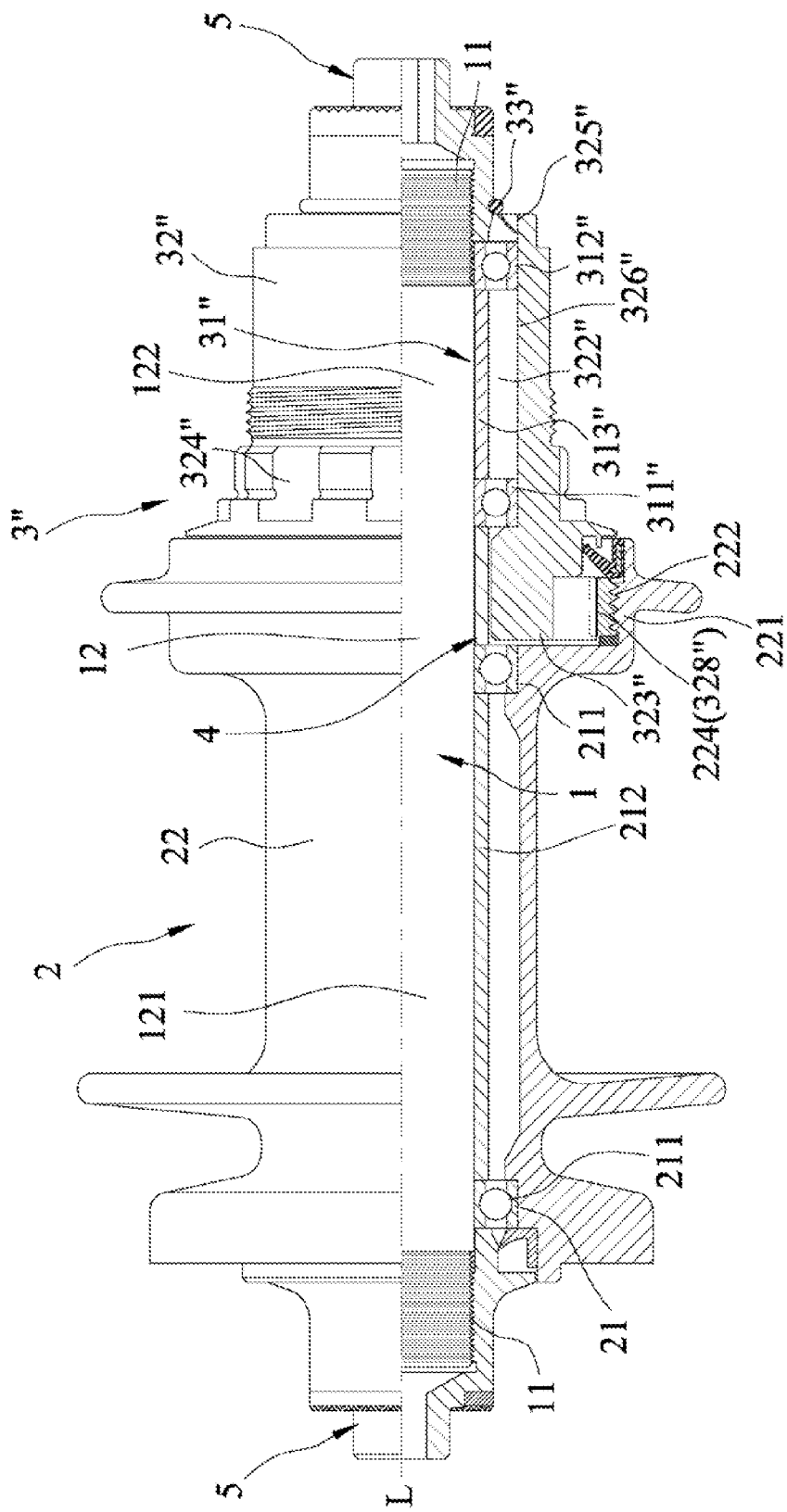
FIG. 4 is an assembled partly sectional view, illustrating still another one of the sprocket carriers being mounted on the axle member of the preferred embodiment.

As further shown in FIGS. 2 to 4, the sprocket carriers 3, 3', 3" can be alternatively mounted on the carrier-mounting section 122 of the central portion 12 of the axle member 1. Each of the sprocket carriers 3, 3', 3" includes a tubular carrier body 32, 32', 32", a driving structure 323, 323', 323", and a second bearing unit 31, 31', 31".

The carrier body 32, 32', 32" of each of the sprocket carriers 3, 3', 3" has an outer profile 324, 324', 324" and an inner through hole 322, 322', 322". The outer profiles 324, 324', 324" of the carrier bodies 32, 32', 32" are different from one another. In this embodiment, the three sprocket carriers 3, 3', 3" are respectively suitable for SHIMANO sprocket assembly (see FIG. 2), CAMPAGNOLO sprocket assembly (see FIG. 3) and SRAM sprocket assembly (see FIG. 4). The inner through hole 322, 322', 322" of each of the carrier bodies 32, 32', 32" extends in an axial direction of the carrier body 32, 32', 32", and has an installation hole section 326, 326', 326" and a remaining hole section 325, 325', 325" along the axial direction. The installation hole section 326, 326', 326" of each of the carrier bodies 32, 32', 32" has a length the same as that of the carrier-mounting section 122 of the central portion 12 of the axle member 1.

The second bearing unit 31, 31', 31" of each of the sprocket carriers 3, 3', 3" includes an inner bearing 311, 311', 311", an outer bearing 312, 312', 312" and a spacing sleeve 313, 313', 313". The inner bearing 311, 311', 311" and the outer bearing 312, 312', 312" of the second bearing unit 31, 31', 31" of each of the sprocket carriers 3, 3', 3" are respectively disposed at opposite ends of the installation hole section 326, 326', 326" of the inner through hole 322, 322', 322" of the sprocket carrier 3, 3', 3", and are respectively distal from and proximate to the remaining hole section 325, 325', 325" of the inner through hole 322, 322', 322" of the sprocket carrier 3, 3', 3". The spacing sleeve 313, 313', 313" of the second bearing unit 31, 31', 31" of each of the sprocket carriers 3, 3', 3" is sandwiched between the inner bearing 311, 311', 311" and the outer bearing 312, 312', 312" of the second bearing unit 31, 31', 31" of the respective sprocket carrier 3, 3', 3". Each of the inner bearings 311, 311', 311", the outer bearings 312, 312', 312" and the spacing sleeves 313, 313', 313" of the sprocket carriers 3, 3', 3" has an inner diameter that is equal to an outer diameter of the carrier-mounting section 122 of the central portion 12 of the axle member 1.

Any one of the sprocket carriers 3, 3', 3" is able to be mounted on the carrier-mounting section 122 of the central portion 12 of the axle member 1 and cooperates with the axle member 1 and the hub shell 2 to serve as a hub assembly. The inner bearing 311, 311', 311", the outer bearing 312, 312', 312" and the spacing sleeve 313, 313', 313" of the mounted one of the sprocket carriers 3, 3', 3" are mounted on the carrier-mounting section 122 of the central portion 12 of the axle member 1 with the inner bearing 311, 311', 311" being proximate to the hub-mounting section 121 of the central portion 12 of the axle member 1, such that the carrier body 32, 32', 32" of the mounted one of the sprocket carriers 3, 3', 3" is rotatable relative to the axle member 1. In this embodiment, the installation hole sections 326, 326', 326" of the inner through holes 322, 322', 322" of the sprocket carriers 3, 3', 3" have different diameters, and the spacing sleeves 313, 313', 313" of the sprocket carriers 3, 3', 3" have different lengths. Moreover, for each of the sprocket carriers 3, 3', 3", the inner bearing 311, 311', 311" and the outer bearing 312, 312', 312" have the same length and the same outer diameter.

For each of the sprocket carriers 3, 3', 3", the driving structure 323, 323', 323" is provided on the carrier body 32, 32', 32" oppositely of the remaining hole section 325, 325', 325" of the inner through hole 322, 322', 322", and has a plurality of pivoted pawls 328, 328', 328". The driven structure 222 and the driving structure 323, 323', 323" of the mounted one of the sprocket carriers 3, 3', 3" are configured as a ratchet mechanism, and mesh with each other such that rotation of the carrier body 32, 32', 32" of the mounted one of the sprocket carriers 3, 3', 3" drives rotation of the shell body 22 of the hub shell 2.

It is noted that the configurations of the driven structure 222 and the driving structures 323, 323', 323" of the sprocket carriers 3, 3', 3" may be interchanged. For example, the driven structure 222 may be configured as a plurality of pivoted pawls, and each of the driving structures 323, 323', 323" of the sprocket carriers 3, 3', 3" may be configured as a plurality of angularly spaced-apart ratchet teeth.

The spacing member 4 is mounted on the axle member 1 and is sandwiched between the first bearing unit 21 and the second bearing unit 31, 31', 31" of the mounted one of the sprocket carriers 3, 3', 3".

The end caps 5 are secured respectively on the threaded end portions 11 of the axle member 1 for positioning the hub shell 2 and the mounted one of the sprocket carriers 3, 3', 3" on the axle member 1.

Each of the sprocket carriers 3, 3', 3" further includes a seal member 33, 33', 33". The seal member 33, 33', 33" of the mounted one of the sprocket carriers 3, 3', 3" is disposed between the carrier body 32, 32', 32" of the mounted one of the sprocket carriers 3, 3', 3" and one of the end caps 5 adjacent to the mounted one of the sprocket carriers 3, 3', 3" for sealing the remaining hole section 325, 325', 325" of the inner through hole 322, 322', 322" of the mounted one of the sprocket carriers 3, 3', 3".

To sum up, since the second bearing unit 31, 31', 31" of each of the sprocket carriers 3, 3', 3" has a total length the same as that of the carrier-mounting section 122 of the central portion 12 of the axle member 1, and since each of the inner bearings 311, 311', 311", the outer bearings 312, 312', 312" and the spacing sleeves 313, 313', 313" of the sprocket carriers 3, 3', 3" has an inner diameter equal to an outer diameter of the carrier-mounting section 122, the axle member 1 in the invention is suitable for any one of SHIMANO, CAMPAGNOLO and SRAM sprocket assemblies by being mounted with a corresponding one of the sprocket carriers 3, 3', 3". Moreover, compared with the conventional sprocket carrier disclosed in Taiwanese Patent No. M399087, each of the sprocket carriers 3, 3', 3" in this invention has a superior mechanical strength.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A hub module comprising:
    an axle member extending along an axis and having
        two threaded portions at opposite ends thereof that are disposed along the axis, and
        a central portion that has a hub-mounting section and a carrier-mounting section disposed along the axis;
    a hub shell including
        a shell body that surrounds and that is rotatable about said hub-mounting section of said central portion of said axle member,
        a driven structure that is provided on said shell body, and
        a first bearing unit that includes a pair of bearings spaced apart along the axis and journaled between said shell body and said hub-mounting section of said central portion of said axle member;
    first and second sprocket carriers, each including
        a tubular carrier body that has
            an outer profile, and
            an inner through hole extending in an axial direction of said tubular carrier body and having an installation hole section and a remaining hole section along the axial direction, said installation hole section having a length the same as that of said carrier-mounting section of said central portion of said axle member,
        a driving structure that is provided on said tubular carrier body, and
        a second bearing unit that includes
            an inner bearing and an outer bearing respectively disposed at opposite ends of said installation hole section of said inner through hole, and
            a spacing sleeve sandwiched between said inner and outer bearings, said inner bearing, said outer bearing and said spacing sleeve having an inner diameter that is equal to an outer diameter of said carrier-mounting section of said central portion of said axle member, said outer profile of said tubular carrier body of said first sprocket carrier being different from said outer profile of said tubular carrier body of said second sprocket carrier, wherein an alternative one of said first and second sprocket carriers is mounted on said carrier-mounting section of said central portion of said axle member, said inner and outer bearings and said spacing sleeve of the alternative one of said first and second sprocket carriers being mounted on said carrier-mounting section of said central portion of said axle member such that said tubular carrier body of the alternative one of said first and second sprocket carriers is rotatable about said axle member, said driving structure of the alternative one of said first and second sprocket carriers meshing with said driven structure of said hub shell such that rotation of said tubular carrier body of the alternative one of said first and second sprocket carriers drives rotation of said shell body of said hub shell;
    a spacing member mounted on said axle member and sandwiched between said first bearing unit and said second bearing unit of the alternative one of said first and second sprocket carriers; and
    a pair of end caps secured respectively on said threaded end portions of said axle member for positioning said hub shell and the alternative one of said first and second sprocket carriers on said axle member.

2. The hub module as claimed in claim 1, wherein said inner and outer bearings of each of said first and second sprocket carriers have the same length and the same outer diameter.

3. The hub module as claimed in claim 2, wherein said installation hole section of said inner through hole of said first sprocket carrier has a diameter different from a diameter of said installation hole section of said inner through hole of said second sprocket carrier.

4. The hub module as claimed in claim 3, wherein said spacing sleeve of said first sprocket carrier has a length different from a length of said spacing sleeve of said second sprocket carrier.

5. The hub module as claimed in claim 2, wherein said spacing sleeve of said first sprocket carrier has a length different from a length of said spacing sleeve of said second sprocket carrier.

6. The hub module as claimed in claim 1, wherein said driven structure has a plurality of angularly spaced-apart teeth, and said driving structure of each of said first and second sprocket carriers has a plurality of pivoted pawls, said driven structure and said driving structure of the alternative one of said first and second sprocket carriers being configured as a ratchet mechanism.

7. The hub module as claimed in claim 1, wherein each of said first and second sprocket carriers further includes a seal member for sealing said remaining hole section of said inner through hole of said tubular carrier body of the corresponding one of said first and second sprocket carriers.

* * * * *